R. F. CRAWFORD.
POWER TRANSMISSION DEVICE FOR MOTOR VEHICLES.
APPLICATION FILED NOV. 26, 1918.
1,301,657.
Patented Apr. 22, 1919.
2 SHEETS—SHEET 1.
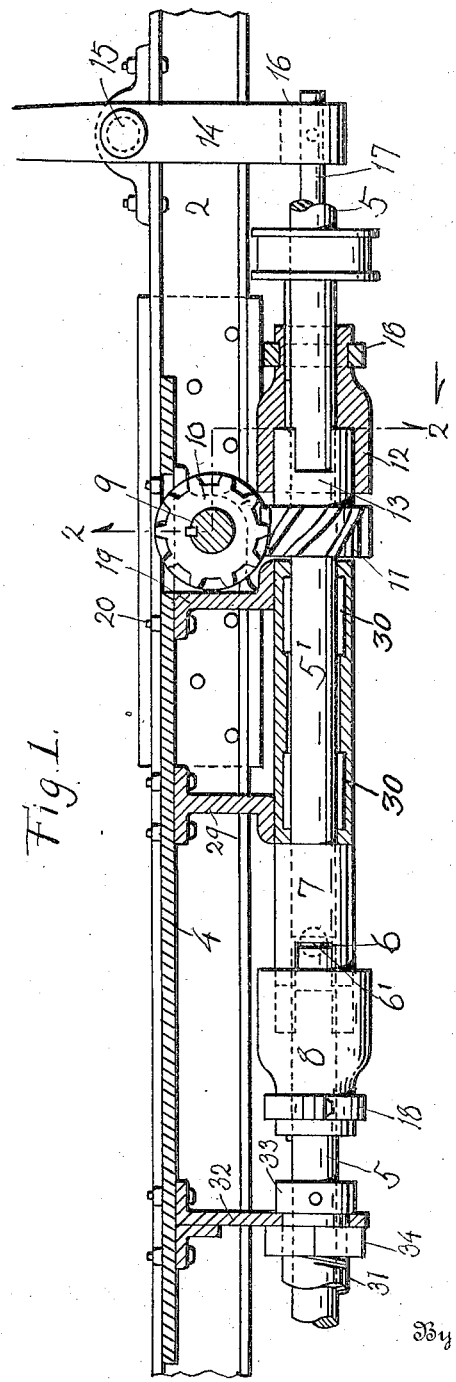
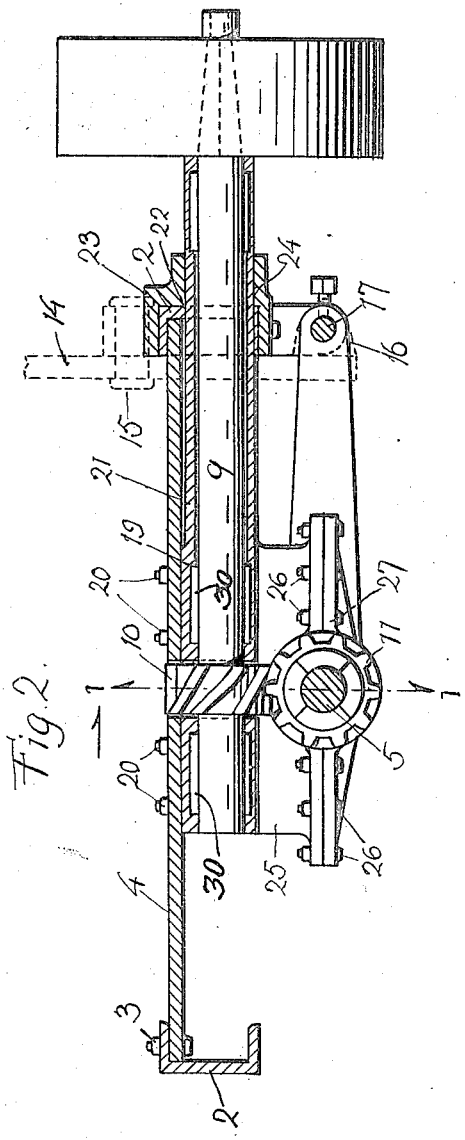
Inventor
Ralph F. Crawford,
By E. W. Anderson
Attorneys R. F. CRAWFORD.
POWER TRANSMISSION DEVICE FOR MOTOR VEHICLES.
APPLICATION FILED NOV. 26, 1918.
1,301,657. Patented Apr. 22, 1919.
2 SHEETS—SHEET 2.
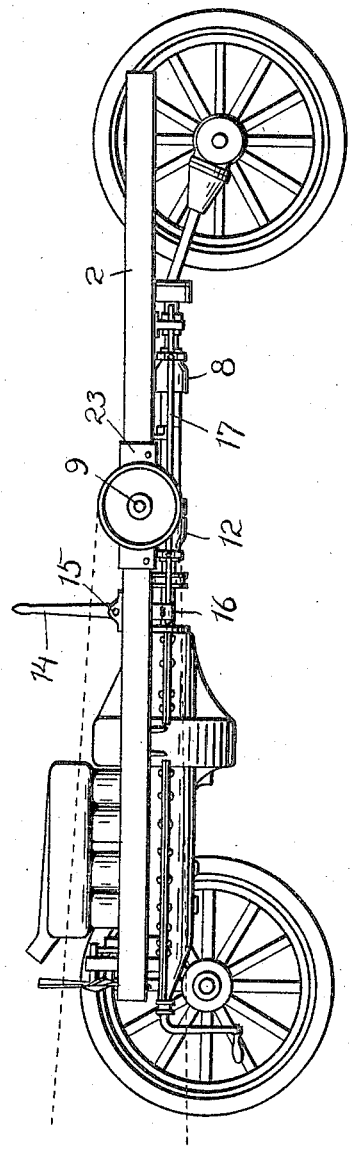
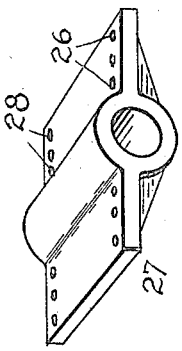
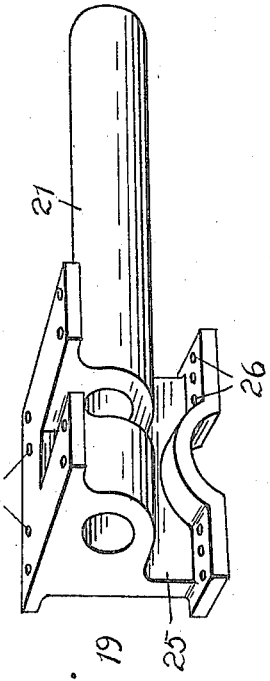
Inventor:
Ralph F. Crawford.
E. W. Anderson
By
Attorneys

UNITED STATES PATENT OFFICE.

RALPH F. CRAWFORD, OF MONTICELLO, NEW YORK.

POWER-TRANSMISSION DEVICE FOR MOTOR-VEHICLES.

1,301,657.     Specification of Letters Patent.     Patented Apr. 22, 1919.

Application filed November 26, 1918. Serial No. 264,195.

*To all whom it may concern:*

Be it known that I, RALPH F. CRAWFORD, a citizen of the United States, resident of Monticello, in the county of Sullivan and State of New York, have made a certain new and useful Invention in Power-Transmission Devices for Motor-Vehicles; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is longitudinal section on the line 1—1 Fig. 2.

Fig. 2 is a transverse section on the line 2—2 Fig. 1.

Fig. 3 is a side view of the invention, as applied.

Fig. 4 is a detail perspective view of one of the boxings.

Fig. 5 is a similar view of the other boxing.

The invention has relation to power transmission devices or attachments for motor vehicles, having for its object to provide improved means, adapted to be permanently attached to the car and always in place, for converting an ordinary pleasure or business car or truck at will, by the mere throwing of a lever, into a power machine for use wherever an engine is needed, as in sawing wood, pumping water, driving a threshing machine, filling silos, running feed grinders, etc., the invention being located below the body of the car, out of sight and protected from dust and dirt, and in no way detracting from the appearance of the vehicle.

The invention consists in the novel construction and combinations of parts, as hereinafter set forth.

In the accompanying drawings, illustrating the invention, the numeral 2 designates the usual horizontal longitudinal channel-form beams, forming a part of the framework of the vehicle, and bolted to and bridging these beams at 3 is a horizontal metallic or steel plate 4, from which are hung the supports to be described hereinafter.

The drive shaft of the vehicle is shown at 5, and between the transmission gearing and the differential gearing this shaft is divided or cut at 6, the forward shaft section having at its divided or cut end a clutch member 7, and the rear shaft section carrying a sliding clutch member 8, coöperating with the member 7. A ball bearing 6' is interposed between the divided ends of the shaft, to take up endwise thrust.

A horizontal transverse countershaft 9, at right-angles to and located above the drive shaft, is provided with a spiral gear 10, constantly in mesh with a spiral gear 11 loosely mounted upon the drive shaft, a clutch member 12, sliding upon the drive shaft and having a spline connection therewith, engaging a coöperating clutch member 13 of the gear 11.

A shifting lever 14, fulcrumed at 15, has connection at 16 with a shift rod 17, the latter having connection with collars 18 of the clutch members 8 and 12, whereby, upon movement of the lever in one direction, the drive shaft sections will be disconnected and the countershaft clutched with the forward drive shaft section, and upon movement of the lever in the opposite direction, the drive shaft sections will be clutched together or operatively connected and the countershaft disconnected or unclutched from the forward drive shaft section.

It is essential that the forward and rear drive shaft sections shall be always supported and held in absolutely rigid relation and in alinement with each other, and that the countershaft shall be also supported and held always in rigid relation to the drive shaft. To this end, the countershaft is journaled in a boxing 19, bolted to the plate 4 at 20, immediately above the drive shaft and at each side thereof and centrally of said plate, this boxing having an extension 21 surrounding the countershaft and engaging at its outer end portion within a perforation or opening 22 of one of the channel-form beams 2, said beam provided at this point with a U-shaped reinforcing member 23, perforated at 24 to admit the end portion of said extension. The boxing and the extension thereof extend substantially the full length of the countershaft, being held up to the plate 4 by the bolts 20 engaging the body of the boxing, and by engagement of the outer end of the extension 21 with the channel-form beam and by the said reinforcing member.

The boxing 19 is provided with a depending extension 25 of its body portion, to the lower end of which is bolted at 26 one end portion of a second boxing 27, for the portion of the forward drive shaft section near the divided or cut end of the latter, the other end of said second boxing being bolted at 28 to a depending bracket 29 of the plate 4, each boxing being elongated and provided with double sets of roller or cylinder bearings 30.

The rear drive shaft section is provided with the usual housing 31, and this housing, near the divided or cut end of the shaft section is engaged with a perforation of a depending bracket 32 of the plate 4. The housing is provided with a collar 33, fast thereto and abutting against one side of the said bracket, and with a nut 34, threaded thereon and abutting against the other side of said bracket.

In order that the belt wheel upon the countershaft shall clear the runningboard of the car, and that the belt from said wheel, which is designed to run between one of the front wheels and the body of the car, shall clear the front axle, the countershaft is located above the drive shaft, being preferably 3¾ inches thereabove.

The clutch between the drive shaft sections and the clutch between the forward drive shaft section and the countershaft have their engaging teeth located as close as possible to the drive shaft sections, upon which they are mounted, said teeth being thereby of lesser radial extent or diameter, whereby when the clutch is made with the forward drive shaft section or with the countershaft, the consequent shock or jar is reduced, owing to the lesser speed of rotation of the clutch members than would be the case were they of larger diameter.

And inasmuch as the clutch members interposed between the drive shaft sections and between the countershaft and the rear drive shaft section are subjected to strain or shock in the making of the clutch, between the drive shaft sections in the one case or between the forward drive shaft section and the countershaft in the other case, the portion 5' of the drive shaft, carrying a clutch member related to each said clutch, is provided with an elongated boxing or journal box of sufficient length to contain a double set of cylinder bearings, whereby the greatest possible degree of rigidity is secured for said portion of the drive shaft.

It is further desirable that the boxing or journal box for the said portion of the drive shaft carrying two clutch members, one for each clutch, shall be so connected with the frame or body of the car as to be absolutely rigid therewith, and to this end the horizontal plate 4 is connected as stated to and bridges the longitudinal channel-form frame beams of the car, and to this horizontal bridge plate is securely bolted the boxing or journal box for the upper or countershaft, said boxing having an extension surrounding the countershaft and at its outer end engaging a cylindrical aperture of a hollow boss of a reinforcing member bolted to one of the aforesaid longitudinal channel-form frame beams of the car.

And in order that the drive shaft sections shall be mounted in absolutely rigid relation to each other and to the countershaft, the boxing of the countershaft is provided with a depending extension, to which is securely bolted one end of a second or lower boxing, for the rear drive shaft section, adjacent to the division or cut of the drive shaft, the other end of said second boxing being securely bolted to a depending extension or bracket of the aforesaid horizontal bridge plate.

I claim:

1. In power transmission gearing for motor vehicles, longitudinal channel-form frame beams, a horizontal bridge plate bolted to and connecting said frame beams, alined drive shaft sections, clutch members one of which is slidable carried by the opposing ends of said sections, a countershaft located above and at right-angles to the forward shaft section, a gear upon the countershaft, a gear loosely mounted upon the forward shaft section, constantly in mesh with the first-named gear and provided with a clutch member, a coöperating slidable clutch member upon the forward shaft section, a journal box for the countershaft bolted to said bridge plate, and a journal box for the end portion of the forward shaft section bolted to the first-named journal box.

2. In power transmission gearing for motor vehicles, longitudinal channel-form frame beams, a horizontal bridge plate bolted to and connecting said frame beams, an apertured reinforcing member bolted to one of said beams, a bracket depending from said bridge plate, alined drive shaft sections, clutch members one of which is slidable carried by the opposing ends of said sections, a countershaft located above and at right-angles to the forward shaft section, a gear upon the countershaft, a gear loosely mounted upon the forward shaft section, constantly in mesh with the first-named gear and provided with a clutch member, a coöperating slidable clutch member upon the forward shaft section, a journal box for the countershaft bolted to the said bridge plate and having an extension surrounding the countershaft and engaging the aperture of said reinforcing member, and a journal box for the end portion of the forward shaft section, bolted at one end to the first-named journal box and at its other end bolted to said bracket.

In testimony whereof I affix my signature in presence of two witnesses.

RALPH F. CRAWFORD.

Witnesses:
CLYDE R. CRAWFORD,
OVID W. U. COX.